United States Patent [19]

Warner

[11] 4,023,205
[45] May 10, 1977

[54] AUDIOCARD RETURN MECHANISM

[75] Inventor: Donald E. Warner, Studio City, Calif.

[73] Assignee: Audiotronics Corporation, North Hollywood, Calif.

[22] Filed: Jan. 19, 1976

[21] Appl. No.: 649,979

[52] U.S. Cl. .................. 360/74; 235/61.11 R; 360/2; 360/88
[51] Int. Cl.² .................. G11B 19/02; G06K 7/01
[58] Field of Search ............. 235/61.11 R, 61.11 D; 360/2, 74, 88

[56] References Cited

UNITED STATES PATENTS

| | | |
|---|---|---|
| 3,787,661 | 1/1974 | Moorman et al. .......... 235/61.11 D |
| 3,831,188 | 8/1974 | Zupancic et al. .......... 360/2 |
| 3,898,432 | 8/1975 | Agnew et al. .......... 235/61.11 D |
| 3,940,795 | 2/1976 | Lemelson .......... 235/61.11 D |
| 3,946,438 | 3/1976 | Altmann et al. .......... 235/61.11 D |

Primary Examiner—Daryl W. Cook
Attorney, Agent, or Firm—Ellsworth R. Roston

[57] ABSTRACT

A machine for translating magnetically recorded intelligence on cards into sound. A support means includes card path structure for moving a card past a transducer head by means of a motor driven, switch actuated, drive capstan. A reversing capstan, to return the card to the starting position, can be actuated by a linkage system which also moves the drive capstan away from the transducer head.

15 Claims, 9 Drawing Figures

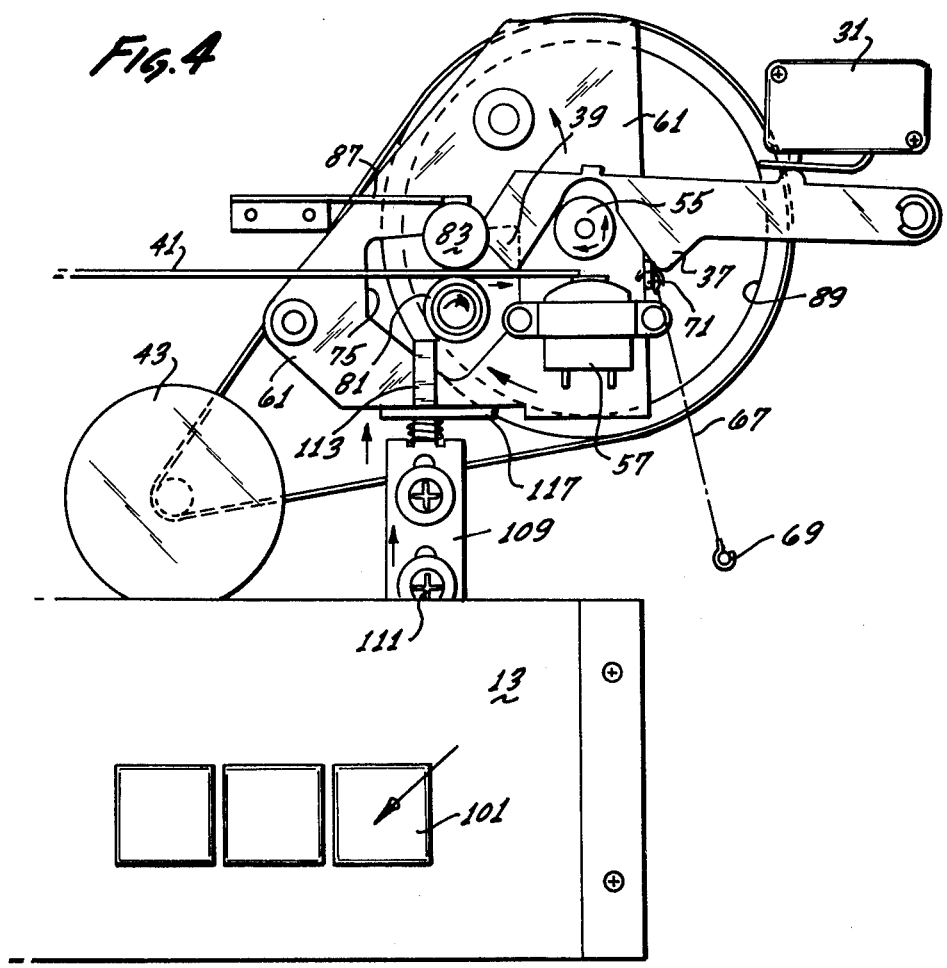
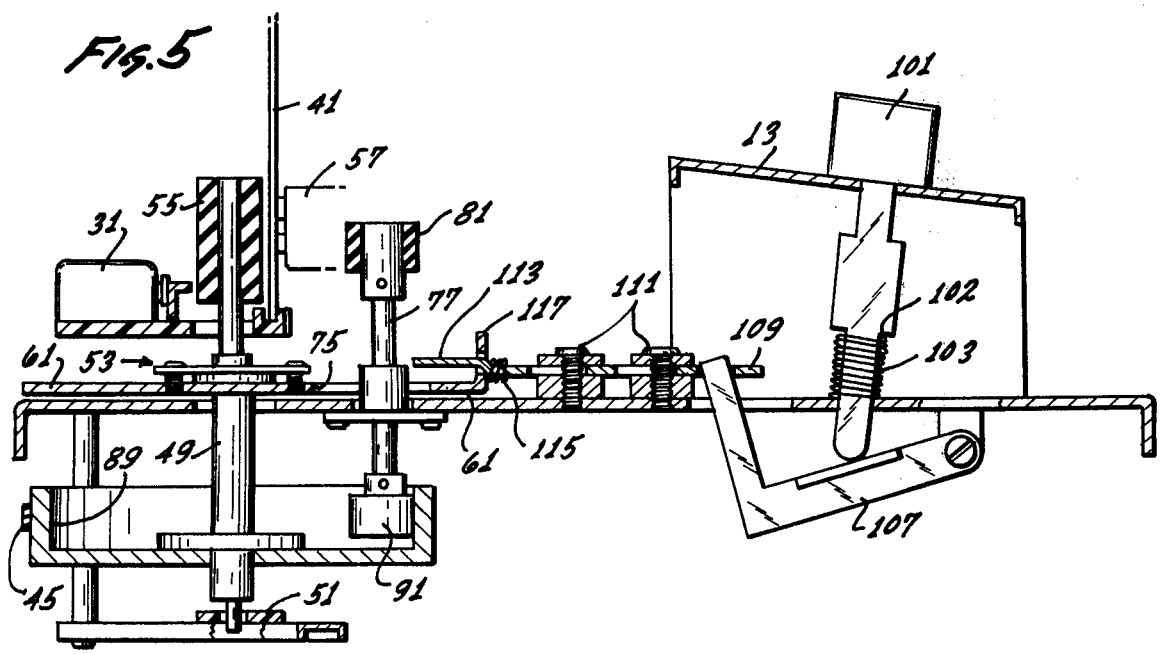

AUDIOCARD RETURN MECHANISM

BACKGROUND OF THE INVENTION

A wide variety of uses have occurred over the past several years for machines which can translate magnetically recorded intelligence into sound or other sensible phenomena. For example, such machines have been used to provide a multisensory approach to learning in order to provide motivation for individual students. In this example, expressly designed cards may be programmed for a particular purpose. The programs are produced on sets of cards with individual cards containing a visual presentation, such as graphic material, word symbols, etc., on the top portion, and a corresponding audio presentation on a strip of magnetic recording material at the bottom portion. To use such a system, a student inserts the card into a pathway in the machine, observes the visual intelligence on the card, and listens to the audio portion of his lesson. In some cases, he may record his response on a special track on the strip of magnetic recording tape and he can then, aurally, compare his response with the lesson material.

Prior art machines which can accomplish the ultimate function desired are well known. For example, in U.S. Pat. No. 3,821,519, such a machine has been described and thoroughly illustrated. With that machine, the operator inserts a card of the type described above into contact with a forward feed drive capstan and transducer head. This positioning of the card causes a switch to activate the capstan, advancing the card past the transducer head. When the card has completed its travel past the capstan, its trailing end moves just beyond the forward drive capstan and stops with the card in alignment with a return drive system. If it is desired to return the card to its original, or starting position, the operator may actuate a control system to close the switch and engage the return drive system, which includes a capstan which can be rotated by the main drive motor. The return drive system moves the card in the direction opposite to that in which it is moved by forward capstan, thereby returning the card to the starting position. This is accomplished by moving the return drive capstan into a position in which an associated drive gear is forced to mesh with a gear of the forward drive system.

At the same time, the control apparatus forces the transducer head away from the card travel path, allowing the card to move freely into the starting position. Unfortunately, this creates another problem: misalignment of the transducer head.

Thus, as has been discussed above, the prior art devices are susceptible to two major problems: (1) the wear and damage which can occur when two gears are moved relative to one another in order to accomplish meshing of the gearing; and (2) misalignment of the transducer head which may be caused by wear, etc., from moving the head each time a card is to be returned, with a resultant loss of quality in play back and/or recording.

Summary of the Invention

The present invention may be embodied in a vastly simplified structure which solves both of these problems simultaneously and accomplishes the ultimate result in an improved manner.

In one embodiment, for example, a forward drive capstan may be pivotally mounted on the machine so as to move into and out of the card path. The drive capstan may be associated with a flywheel which can be pivoted together with the drive capstan. Preferably, the flywheel may provide a friction drive surface which, when the main drive capstan is pivoted out of the card path, will enter into a friction-engaging contact with drive structure operatively associated with the reversing capstan.

In a first embodiment, the pivoting can be accomplished by a linkage device which pushes against it to force the mechanism into the return mode against the force of a spring which tends to pull the mechanism into the forward mode. In a second embodiment, a spring may be utilized to pull the mechanism into the reversing mode when the operator acts upon the linkage to release it from its normal captivity in the forward mode.

In either case, structure may be provided to actuate a switch which, in turn, drives a motor for rotation of the flywheel and the capstan. This may be accomplished by providing a trigger mechanism which extends into the card travel path for actuation of the card as it passes along the path. In one embodiment of such a trigger, an extension may be formed thereon so that the motor is kept running even after the card has passed the transducer head, until the card is removed from the machine. In another trigger embodiment, operation of the linkage by the operator to return the card to its starting position may also actuate the switch to restart the motor which is stopped after the card passes the transducer head.

Upon perusal of the following description, taken together with the accompanying drawings, those skilled in the art will quickly realize that the various features of the invention can be employed in a variety of combinations and a wide variety of embodiments which may not even resemble those depicted but which, nevertheless, employ the invention as set forth in the appended claims.

BRIEF DESCRIPTION OF THE DRAWINGS

FIG. 4 comprises a partial plan view, similar to FIG. 3, illustrating the operation of the reversing mechanism;

FIG. 5 comprises a view similar to that of FIG. 2, illustrating the cooperative relationship of the parts when the structure is in the reversing mode illustrated in FIG. 4;

DETAILED DESCRIPTION

Figure 1:
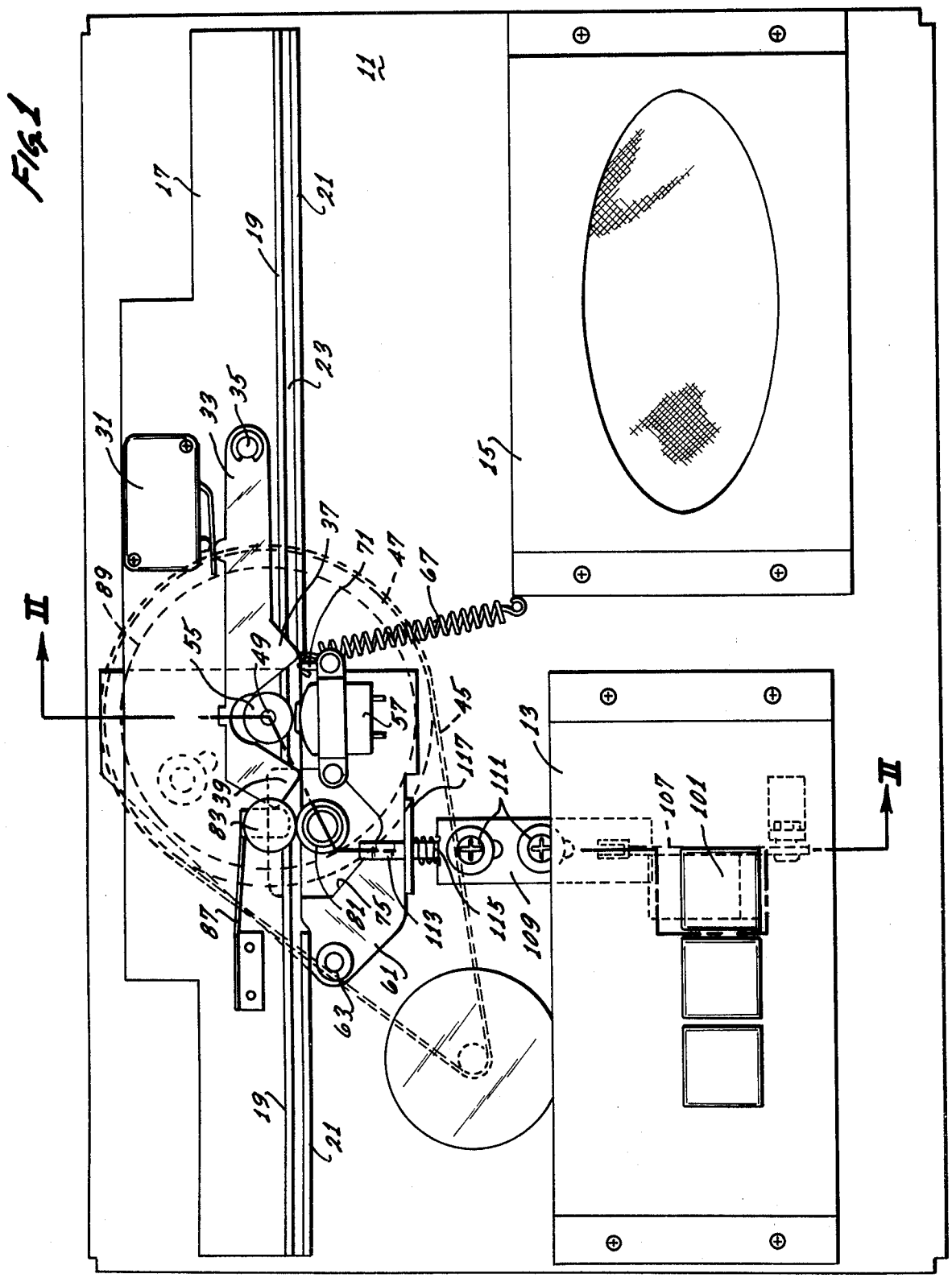
FIG. 1 comprises a diagramatic, plan view of a first embodiment of the present invention.

Referring now to FIG. 1 more specifically, there is shown a machine having a housing 11 upon which may be mounted a control support 13, an audio speaker 15, and other related equipment which need not be described here.

A stand or otherwise elevated structure 17 may also be mounted on the support 11. The stand may provide, near one edge thereof, a pair of flanges 19 and 21, which define a card travel path 23 for an audio card of the type previously described. Those skilled in the art will realize, however, that the stand 17 need not be provided and, per se, is not a part of the invention, so long as some structure is provided to define the card travel path 23.

Although the card travel path is illustrated as extending from one side of the device to the other, that portion of the path with which this invention is concerned may be considered to be limited to that portion near the center of the device, from just before the forward drive mechanism to just beyond the reverse drive mechanism, as will be described.

Figure 2:
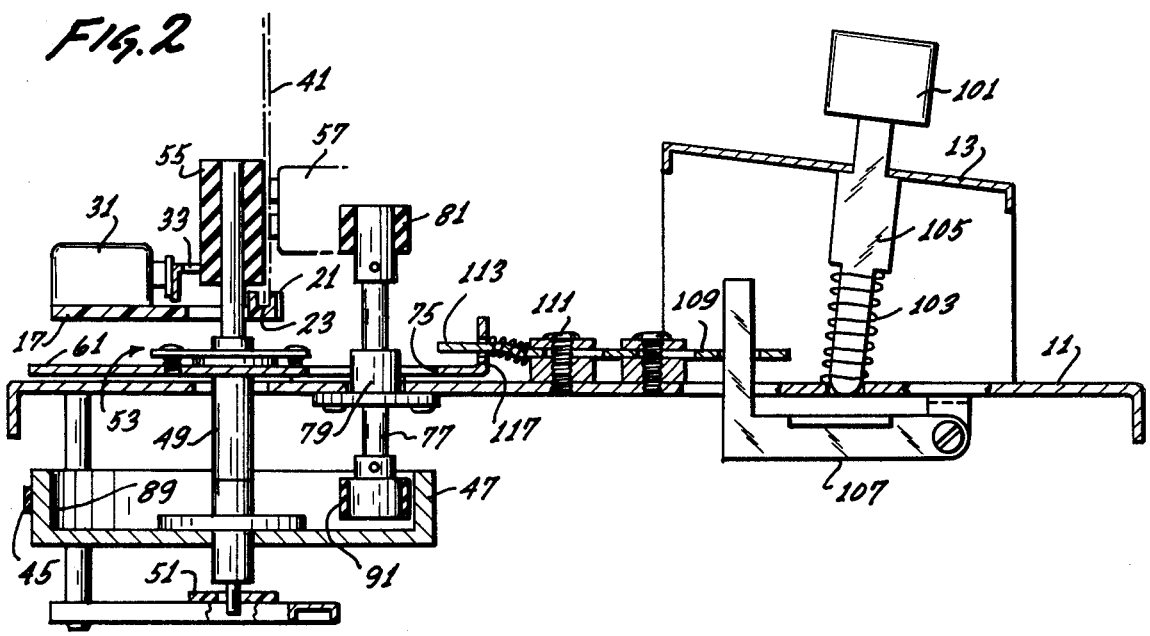
FIG. 2 comprises a side sectional view of the present invention as seen along the line II—II of FIG. 1.
Figure 3:
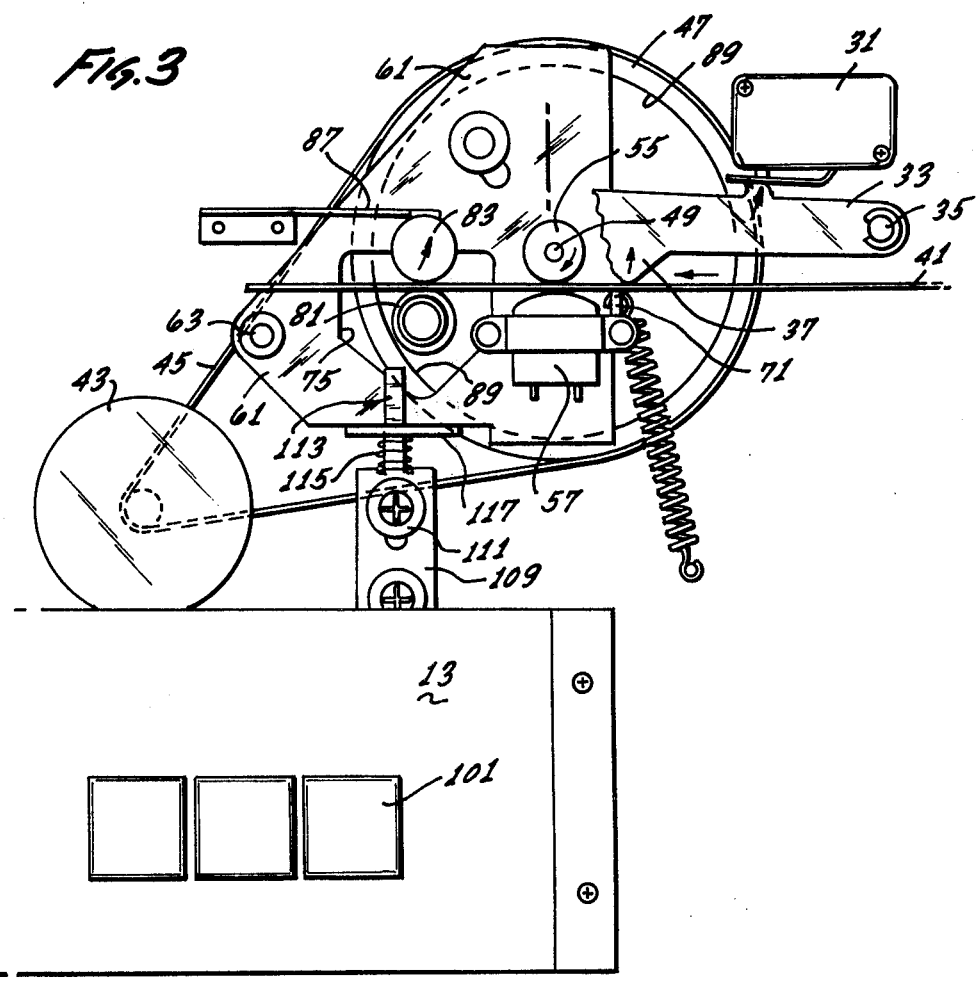
FIG. 3 comprises a partial plan view, similar to FIG. 1, illustrating operation of the device with a card.

Referring now to FIGS. 1–3 together, a switch 31 may be mounted either on the support 11 or the stand 17 for actuation of a motor 43 which may be mounted below the support 11 or in any other position desired. A trigger 33 may be suitably mounted to move about a pivot 35 in order to actuate the switch 31, as illustrated. The trigger may be provided with a first actuating section 37 and a second actuating section 39, if desired. Each actuating section, in any event, extends into the card travel path 23 as illustrated in FIG. 1. Consequently, as shown in FIG. 3, when a card 41 is positioned in the path 23, it will abut the leading surface of the actuator section 37 to move the trigger into a position in which switch 31 is closed to drive the motor.

Motor 43, when actuated by the switch 31, may be used to drive a belt 45 which, in turn, causes the rotation of a flywheel 47. Flywheel 47 may be mounted on a rotatable shaft 49. The shaft may be rotatably supported in a bearing 53 and may also be radially movable, in a plane parallel to support 11, relative to a support bearing 51. Near the upper end of the shaft 49, a forward drive capstan 55 may be fixed so that it cooperates with a transducer head 57 in order to press a card 41 against the transducer head as illustrated in FIG. 3.

Shaft 49, carrying the flywheel 47 and the drive capstan 55, is fixedly mounted in the bearing 53 which, in turn is fixed to a link or plate 61 which may be pivoted about a pin 63 fixed in the support 11. Thus, when plate 61 is pivoted, the drive capstan 55 and the flywheel 47 will move with it. Normally, however, a spring 67, anchored to the support 11 by means such as a pin 69, and to the plate 61 by means such as an upright tab 71, draws the plate 61 in a clockwise direction about pivot 63, as seen in FIG. 1, so that the capstan 55 cooperates with the transducer 57.

Plate 61 may be provided with an opening 75 therein, through which may pass a shaft 77 which is fixed to the support by means such as a bearing 79. The reader will note that the angle of the line II—II in FIG. 1 distorts the view shown in FIG. 2 somewhat by moving the shaft 77 to the right. However, this has been done only for the sake of convenience and the reader should be aware of the fact that shaft 77 is so located that a reversing capstan 81 located on the upper end thereof extends into the card path 23.

If desired, an idler roller 83 may be provided, mounted on a leaf spring 87 which is fixed to the support 11 or stand 17, as illustrated, to urge a card in the path 23 toward the reversing capstan 81. The reversing capstan 81 is free wheeling and can rotate in either direction about its axis since no driving force is normally applied thereto.

As shown in FIG. 2, flywheel 47 may be provided with a friction driving surface 89 cooperable, at certain times, with a friction driving roller 91 fixed to the shaft 77. When the roller 91 rotates, the shaft 77 and the reversing capstan 81 rotate in the same direction and to the same extent. Those skilled in the art will realize, of course, that a friction driving surface such as that illustrated at 89 on the flywheel, may be provided on any portion of the flywheel so long as a cooperative relationship between the driving surface and the driven roller 91 may be selectively created.

Referring to FIGS. 1–5 together, the use of a machine of this embodiment will now be described. A user first takes a card and inserts it into the travel path 23, pushing the trigger section 37 in such a manner that the switch 31 causes the motor 43 to begin operation. Through belt 45 and flywheel 47, capstan 55 begins rotating. When the card 41 is pushed between the capstan 55 and the transducer head 57, the rotation of the capstan will cause the card to move to the left, in contact with head 57, as seen in FIGS. 1, 3, and 4. Movement of the card continues until the card passes beyond friction contact with the capstan 55, to approximately the position illustrated in FIG. 4.

During this time, reversing capstan 81, has been free wheeling. Consequently, idle roller 83 has been biasing the card 41 toward the reversing capstan, but these two rollers have done nothing to inhibit the progress of the card. When the card reaches the point of its travel beyond the influence of drive capstan 55, it may either be removed from the path 23 by the user or driven back to the starting position. If this latter action is desired, the operator need only push the button 101 on the control stand 13. As shown in FIGS. 2 and 5 particularly, button 101 is normally biased in an upward direction by means of a coil spring 103 which acts between a shoulder 105 on the button shaft and the upper surface of the support 11. The button shaft may pass through an opening in the support in the manner illustrated to cooperate with a crank arm 107, causing the crank arm to be pivoted in the counterclockwise direction, as seen in FIGS. 2 and 5, when the button is depressed. Thus, when the button is depressed, the crank arm 107 drives a link 109 to the left, as seen in FIGS. 2 and 5, or towards the back of the machine as illustrated in FIGS. 1, 3, and 4. Movement of link 109 can be controlled by means such as bolts 111, fixed in the support 11 and extending through suitable slots in the link to allow longitudinal but not lateral movement.

Link 109 may be provided with an extension 113 which may pass through an opening in the plate or link 61. A spring 115, coiled about extension 113 and located between the main body of the link 109 and a flange 117 on the second link or plate 61, normally biases the link 109 toward the position illustrated in FIG. 2. However, when button 101 is depressed by the operator, the link 109, acting through the spring 115, forces the link or plate 61 in a counterclockwise direction, as viewed from above, and into the position illustrated in FIG. 4. When this has been accomplished, the flywheel 47 is moved to bring its friction drive surface 89 into contact with the roller 91 as illustrated in FIG. 5, causing the reversing capstan to be driven about its axis in a direction indicated by the arrow in FIG. 4.

Card 41 will thus be driven in a reverse direction—back toward the starting point. Since the card has remained in contact with trigger extension 39 all during this time, no structure is required to restart the motor 43 in order to accomplish this result. When the link or plate 61 is pivoted to the position shown in FIG. 4, the drive capstan 55, which continues to rotate under the power delivered by motor 43, will move (since shaft 77 moves with link 61) out of the card travel path so that movement of the card in the reverse direction will not be inhibited.

When the card has reached the starting position, or when any location along the card upon which information exists which is to be repeated has passed head 57, button 101 may be released. Spring 103 will force the button to the elevated position illustrated in FIG. 2, spring 67 will cause the link 61 to move from the position shown in FIG. 4 to that shown in FIG. 3, and spring 115 will cause link 109 and crank arm 107 to move from the position of FIG. 5 to that of FIG. 2. As soon as this is accomplished, the drive capstan 55 will once again provide driving power to the card 41 and the reversing capstan 81 will be released so as to again be free wheeling. This operation may be repeated as often as the operator desires.

Referring now to FIGS. 6–9, those elements which are substantially identical to the structure illustrated in FIGS. 1–5 have been provided with identical identification numerals. Consequently, only that structure which differs in any way from the preceding embodiment need now be described.

In this embodiment, a plate or link 201 is mounted to pivot about a pin 203 fixed to the support 11. The plate may be provided with an opening 205 so that the shaft 77 may pass therethrough without obstruction, regardless of the position of the plate.

Figure 6:
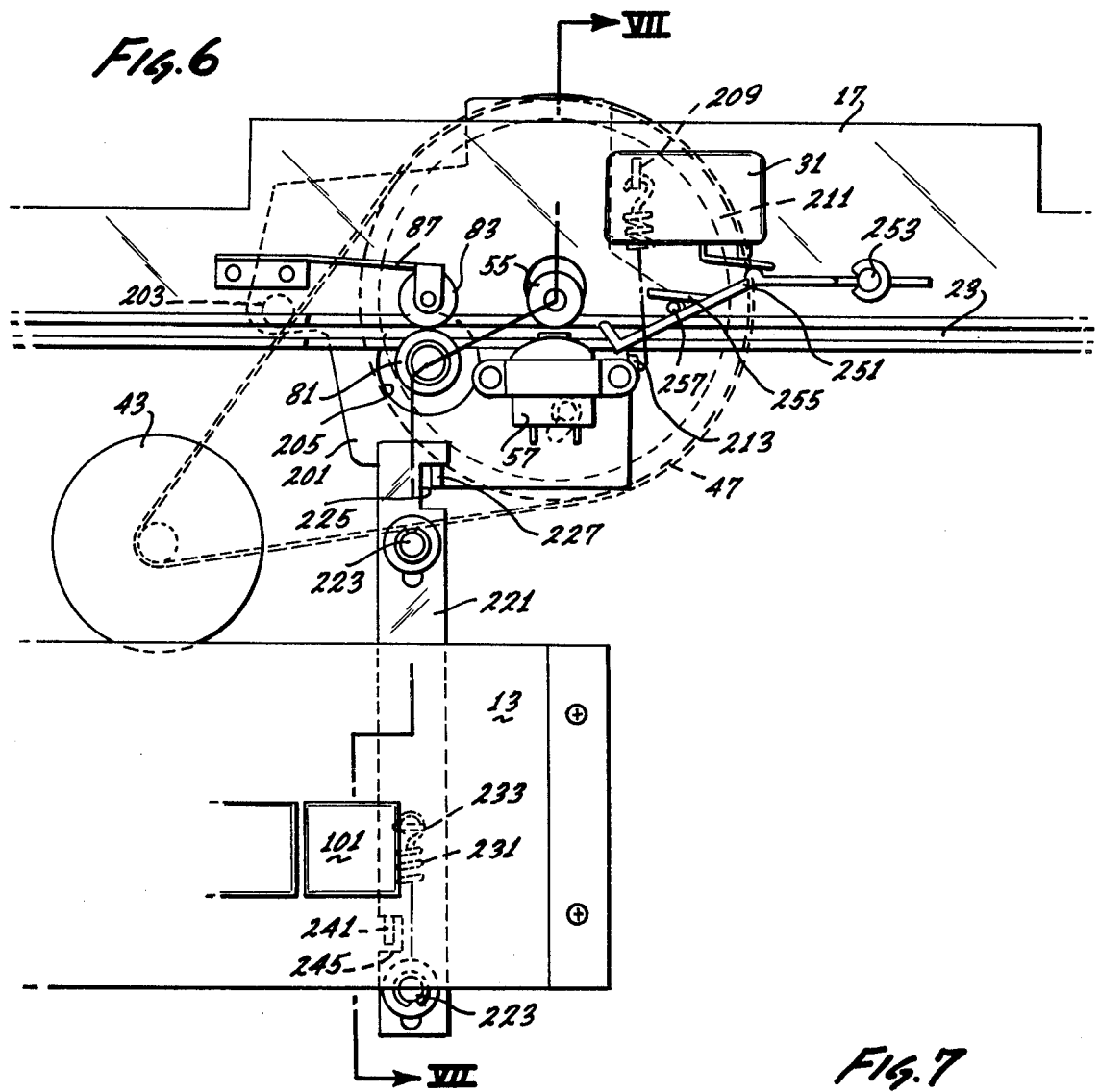
FIG. 6 comprises a partial, diagramatic, plan view of a second embodiment of the present invention.
Figure 7:
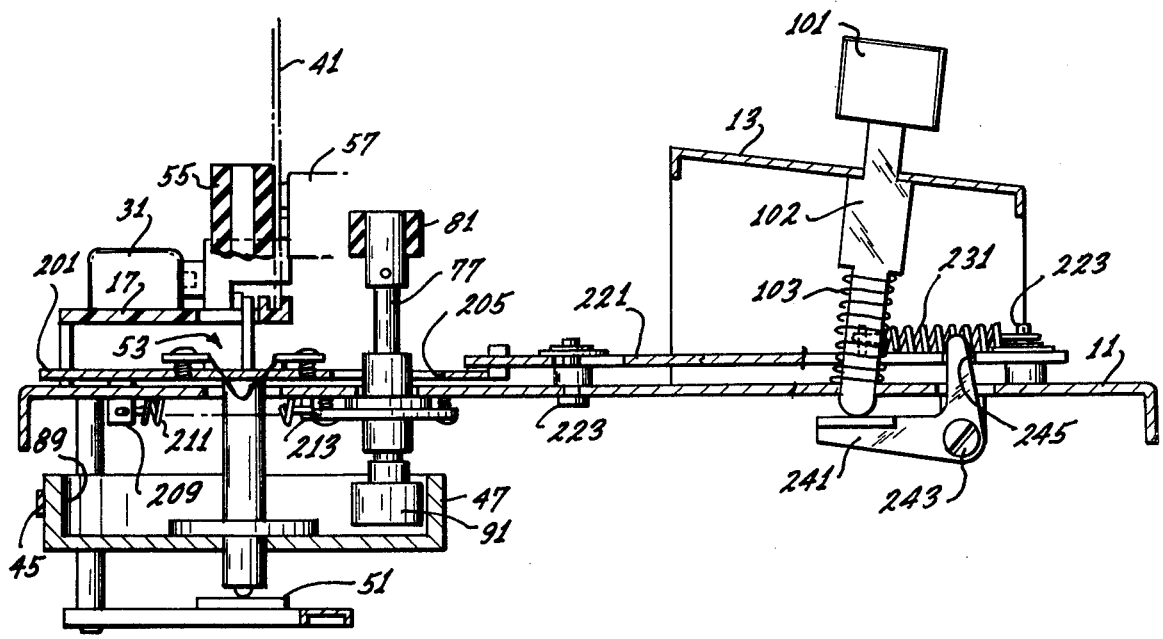
FIG. 7 comprises a sectional side view of the device shown in FIG. 6, as shown along the line VII—VII therein.
Figure 8:
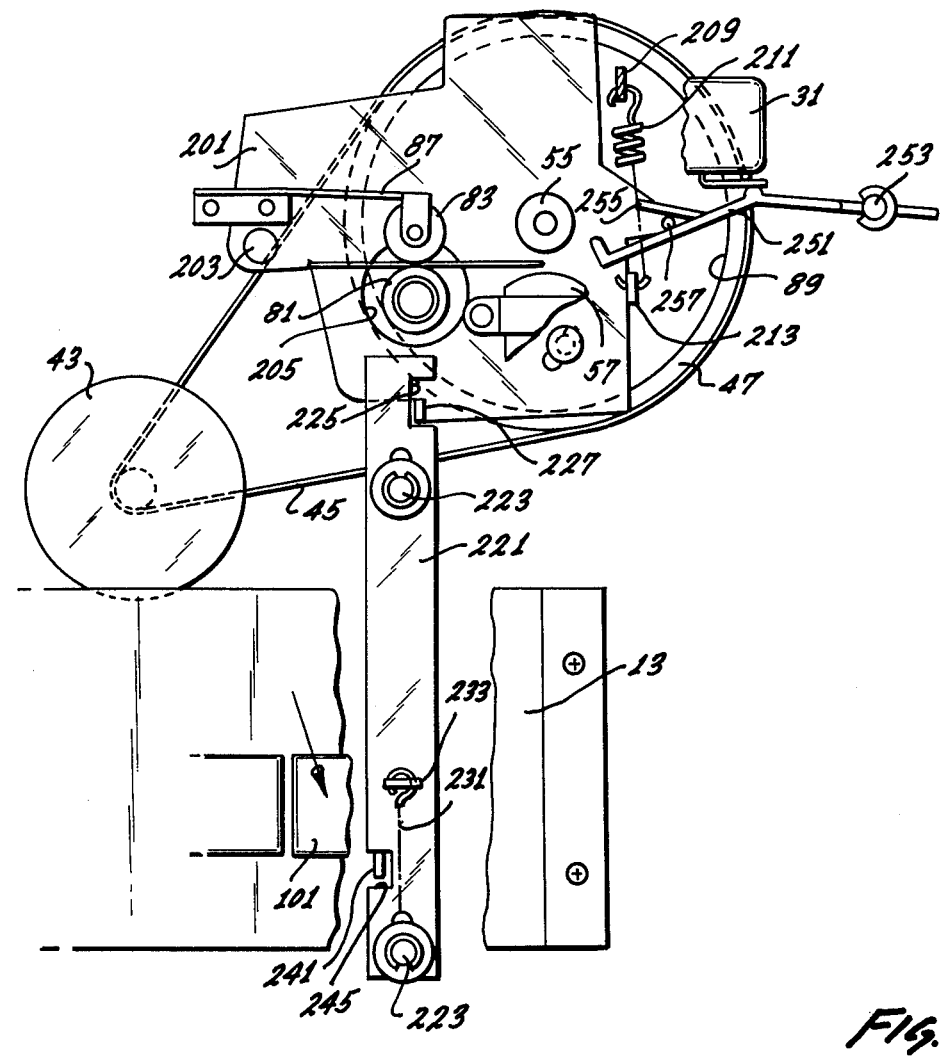
FIGS. 8 and 9 comprise a partial plan view and a side, sectional view, respectively, of the embodiment shown in FIGS. 6 and 7 illustrating the position of the structure in the reversing mode.
Figure 9:
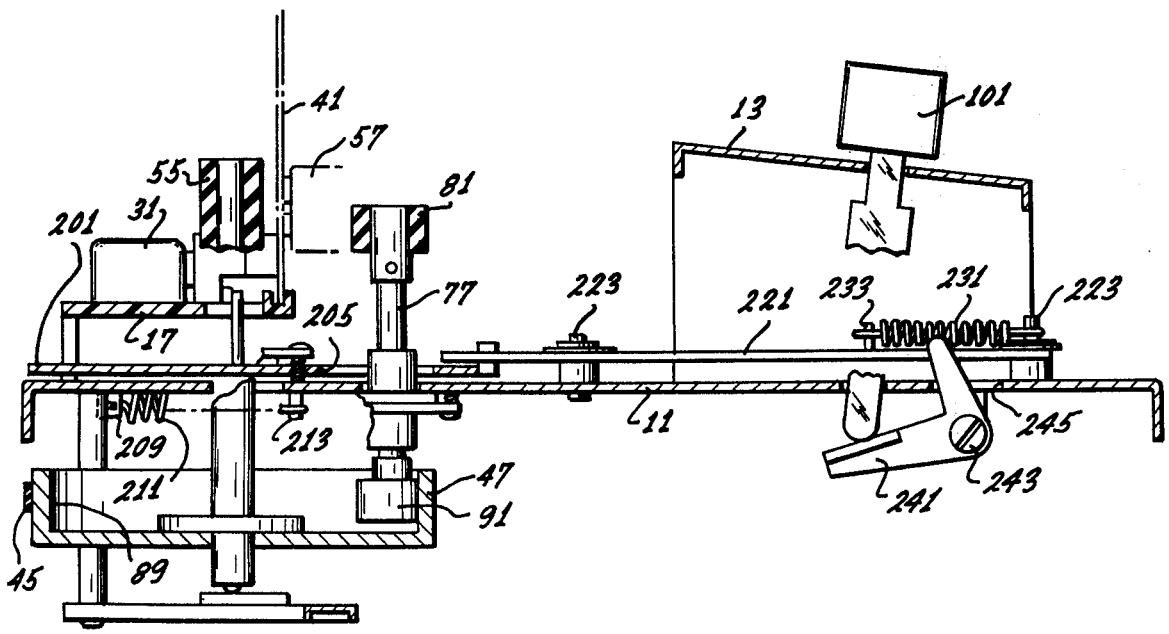

As in the case of the first embodiment, the forward drive capstan 55 and the flywheel 47 may be mounted in a fixed bearing 53 which is attached to the link 201 for movement therewith. In this embodiment, however, a tab 209, which may be integral with the support 11, is formed to extend downwardly, as shown in FIGS. 7 and 9, for attachment of a spring 211 thereto. The opposite end of the spring may be fixed to a pin 213 which is fixed in the plate 201. Thus, the spring 211 tends to draw the plate 201 in the counterclockwise direction, as seen in FIGS. 6 and 8, i.e., it urges capstan 55 from its cooperation with the transducer head 57 and friction drive surface 89 toward contact with the roller 91.

However, in this embodiment, a link 221 may be suitably mounted and guided for movement on the support 11 by means such as bolts or pins 223 which allow longitudinal motion but prohibit lateral motion. At the end of the link 221 a notch 225 may be formed for cooperation with a tab 227 extending from the link or plate 201. A spring 231, acting between a pin 223 and a pin or tab 233 on the link 221, tends to draw the link 221 toward the front of the machine so that the rear end of notch 225 pulls upon the tab 227, thus pulling link 201 into a position such that the drive capstan 55 is in its cooperative relationship with the transducer head 57.

In using this embodiment, an operator who wishes to reverse the direction of card motion depresses button 101 as described in the previous embodiment. However, in this instance, the button acts against a crank arm 241, pivoting it about a pivot point 243, thus driving link 221 toward the rear of the machine from the position illustrated in FIGS. 6 and 7 to that illustrated in FIGS. 8 and 9. As shown, the crank arm may cooperate with a slot or notch 245 to push the link 201 against the biasing force of spring 231. When this occurs, the link 201 will be drawn in a counterclockwise direction, as seen from above, by spring 211, thus drawing the flywheel into friction engagement with the reversing capstan friction driver 91 and pulling the forward drive capstan 55 away from its cooperative relationship with the transducer head 57.

It will have been realized by those skilled in the art that the particular switch actuating trigger illustrated in this embodiment does not cooperate with the card to maintain the motor 43 in operation after the card has passed the forward drive capstan 55. Of course, if desired, the trigger illustrated with the first embodiment could be used here and vise versa.

In any event, however, in this embodiment, a trigger 251 has been illustrated which may be pivoted about a pin 253. As shown in FIG. 6, the trigger normally extends into the card travel path 23. However, this trigger may be provided with a finger 255 thereon which may be in cooperative relationship with a pin 257 attached to or fixed in the plate or link 201. Thus, when button 101 is depressed and spring 211 pivots the link 201, pin 257 will act against trigger finger 255 to draw the trigger about its pivot point 253, causing switch 31 to actuate motor 43. In this manner, a student or other operator of the machine may cause the card to be driven in a reverse direction, either back to the starting point or to some other point at which information to be repeated is located.

Those skilled in the art will now appreciate that this invention may be embodied in a wide variety of structures which may not even resemble those depicted here. Further, the invention incorporates even further advantages which will now become apparent. For example, although not critical to the invention, in both of the illustrated embodiments the reverse driving mechanism has been arranged so that movement of the flywheel toward the friction drive roller tends to "pinch" the roller against the friction drive surface in order to eliminate any possible slipage between them when contact is made. Similarly, both embodiments incorporate structure which prevents damage to the machine if an operator should press too hard on the button 101. In other words, the springs, notches, etc., provide sufficient "play" between the elements to prevent damage no matter how hard the button is pushed to reverse the card travel direction.

These and similar embodiments and advantages will now be apparent, to those skilled in the art, enjoying the benefits of the invention as described in the following claims.

I claim:

1. In a card handling machine,
    transducer means for aurally reproducing matter recorded on a card,
    means for driving a card past said transducer means in a first direction in which matter recorded on such a card is aurally reproduced including capstan means for urging such a card against said transducer means, and means for rotating said capstan means including motor means and flywheel means interconnecting said motor means and said capstan means, means for driving a card past said transducer means in a second direction, to return such a card to a position in which it may be driven by said first direction drive means, including second capstan means and means for selectively driving said second capstan means including means for moving said flywheel means relative to said second capstan means to cause contact therebetween to drive said second capstan means, and means for selectively moving said first-recited capstan means to a position in which it cannot urge a card against said transducer means.

2. The machine of claim 1 including switch means mounted on said support means for selective actuation of said motor means and trigger means mounted on said support for actuation of said switch means by movement of a card into position between said transducer means and said first-recited capstan means.

3. The machine of claim 2 wherein said trigger means includes means for continuing the actuation of said switch means until a card which has caused actuation of said switch means is manually removed from said machine.

4. The machine of claim 1 wherein said means for relatively moving said flywheel means into driving contact with said second capstan means includes means for actuating said motor means.

5. The machine of claim 4 including switch means mounted on said support means for actuating said motor means having trigger means mounted on said support means in close proximity to said transducer means for actuation of said motor means by a card inserted between said transducer means and said first-recited capstan means, including means for preventing deactuation of said motor means until a card passed between said transducer means and said first-recited capstan means is removed from said machine.

6. In a card handling machine, a support means, means defining a card movement path on said support means, transducer means aligned with an edge of said path for contact with a card passed thereagainst when such a card is moving along said path, first capstan means movably mounted on said support means and extending into said path in opposition to said transducer means to urge a card in said path into contact with said transducer means, second capstan means fixedly mounted on said support means adjacent said path and extending at least to one edge of said path, means for biasing a card in said path into contact with said second capstan means, means for driving said first capstan means including motor means and flywheel means interconnecting said motor means and said first capstan means, and means for driving said second capstan means including means for selectively interconnecting said motor means and said second capstan means via said flywheel means.

7. The machine of claim 6 wherein said biasing means includes idler wheel means and spring means for biasing said idler wheel means toward contact with said second capstan means.

8. The machine of claim 6 including rotatable shaft means interconnecting said first capstan means and said flywheel, first linkage means on said support means pivotally mounting said shaft means, said first capstan means, and said flywheel means for movement relative to said transducer means and said support means, second linkage means selectively operable to pivot said first linkage means, and spring means for normally biasing said first capstan means toward contact with said transducer means.

9. The machine of claim 6 wherein said flywheel means includes drive flange means formed on a surface thereof, said second capstan means includes drive shaft means operatively connected thereto and extending into close, but normally separated, relationship with said drive flange means, and means for selectively moving said drive flange means and said drive shaft means relative to one another into operative, driving contact for rotation of said second capstan means.

10. The machine of claim 9 including means for biasing one of said drive shaft means and said drive flange means away from driving contact therebetween.

11. The machine of claim 6 including switch means mounted on said support means for selective operation of said motor means upon insertion of a card into said path and trigger means mounted on said support means and extending into said path for actuation of said switch means by a card located in said path.

12. The machine of claim 11 wherein said trigger means includes means for continuing the actuation of said switch means until a card in said path is removed therefrom.

13. A machine for aurally reproducing information recorded upon a card including a support, means on said support defining a card traversing path, transducer means fixedly mounted on said support adjacent said card path for contact with a card in said path, drive motor means fixedly mounted on said support, switch means fixedly mounted on said support for actuation of said drive motor means, trigger means movably mounted on said support and extending into said card path for actuation of said switch means upon the insertion of a card into said path reverse drive capstan means fixedly mounted on said support adjacent said card path and extending thereinto sufficiently to drive a card in said path in a reverse direction including
friction drive means fixed thereto,
first linkage means pivotally mounted on said support,
drive capstan means mounted on said first linkage means for positioning in opposition to said transducer means in said card path to drive a card in said path past said transducer means,
flywheel means mounted on said first linkage means and operatively connected to said drive capstan means and said drive motor to drive the former upon actuation of said switch means, including
a friction drive surface adjacent to, but normally separated from, said friction drive means,
spring means normally biasing said first linkage means toward a position in which said drive capstan is in contact with said transducer means and said friction drive means and said friction drive surface are separated,
second linkage means mounted on said supported and operatively connected to said first linkage means for movement of the latter to a position in which said drive capstan is separated from said transducer means and out of said card path and said friction drive surface is in driving contact with said friction drive means, and
means for selectively actuating said second linkage means.

14. The machine of claim 13 wherein
said first and second linkage means include
means for actuating said switch means upon actuation of said second linkage means.

15. The machine of claim 13 including
means for continuing the actuation of said switch means until a card in said path is removed therefrom.

* * * * *